United States Patent [19]

Odagiri et al.

[11] Patent Number: 4,973,662

[45] Date of Patent: Nov. 27, 1990

[54] ENDCAPPING AGENT FOR POLYIMIDE, POLYIMIDE VARNISH, AND INTERMEDIATE MATERIAL FOR FIBER-REINFORCED COMPOSITE MATERIAL COMPRISING SAME

[75] Inventors: Nobuyuki Odagiri; Kuniaki Tobukuro, both of Otsu, Japan

[73] Assignee: Director General of Agency of Industrial Science and Technology, Tokyo, Japan

[21] Appl. No.: 247,445

[22] PCT Filed: Jan. 13, 1988

[86] PCT No.: PCT/JP88/00027

§ 371 Date: Sep. 8, 1988

§ 102(e) Date: Sep. 8, 1988

[30] Foreign Application Priority Data

Jan. 13, 1987 [JP] Japan .................................. 62-4037

[51] Int. Cl.$^5$ ..................... C08G 69/26; C08G 73/10; B32B 27/00; C07D 209/56
[52] U.S. Cl. ................................... 528/353; 528/128; 528/170; 528/172; 528/322; 528/351; 528/352; 428/272; 428/273; 428/278; 428/287; 428/290; 548/435
[58] Field of Search ............... 528/353, 352, 351, 322, 528/172, 170, 128; 428/272, 273, 278, 287, 290; 548/435

[56] References Cited

U.S. PATENT DOCUMENTS 4,105,646 8/1978 Winter .................. 528/353
4,255,313 3/1981 Antonoplos et al. .......... 528/353
4,395,514 7/1983 Edelman ................... 528/353

*Primary Examiner*—John Kight, III
*Assistant Examiner*—P. Hampton-Hightower
*Attorney, Agent, or Firm*—Austin R. Miller

[57] ABSTRACT

A compound represented by the following general formula [1]:

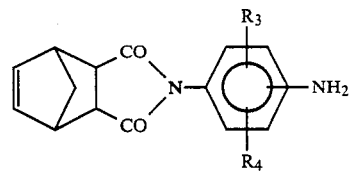

wherein $R_3$ and $R_4$ are independently selected from hydrogen and alkyl groups having 1 to 4 carbon groups, is valuable as an endcapping agent for a polyimide. Namely, a PMR polyimide varnish comprising this compound, a dialkyl tetracarboxylate represented by the following general formula [2]:

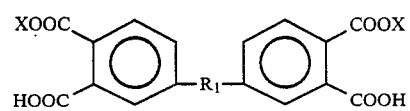

wherein $R_1$ is a direct bond or stands for $CH_2$, O, CO, $SO_2$, S or $C(CH_3)_2$ and X stands for an alkyl group having 1 to 4 carbon atoms, and a diamine represented by the following general formula [3]:

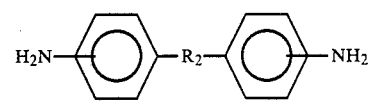

wherein $R_2$ is a direct bond or stands for $CH_2$, O, CO, $SO_2$ S or $C(CH_3)_2$, has a good storage stability and is especially valuable as a matrix resin to be incorporated in a fiber-reinforced composite material.

10 Claims, No Drawings

ENDCAPPING AGENT FOR POLYIMIDE, POLYIMIDE VARNISH, AND INTERMEDIATE MATERIAL FOR FIBER-REINFORCED COMPOSITE MATERIAL COMPRISING SAME

TECHNICAL FIELD

The present invention relates to a PMR type polyimide having an excellent storage stability. More particularly, the present invention relates to a PMR type polyimide having a good storage stability in the form of a varnish and suitable as a matrix resin having high mechanical properties for a fiber-reinforced composite material.

BACKGROUND ART

Since a condensation-polymerization type polyimide becomes insoluble in an organic solvent with an increase of the degree of polymerization, when this polymer is used as a matrix resin of a composite material, a process is adopted in which a so-called amide acid prepolymer before dehydration ring closure is dissolved in a high-boiling-point solvent such as N-methylpyrrolidone (NMP) or dimethylformamide (DMF) and a reinforcing fiber is impregnated with this prepolymer solution. According to this process, however, it is difficult to remove water of condensation formed at the ring closure at the molding step or the high-boiling-point solvent, whereby these volatile components are left in the molded product and voids are formed in the molded article, resulting in a reduction of the physical properties of the molded article.

An addition-curing type polyimide has been developed as a material for solving the above-mentioned problem. The addition-curing type polyimide is an oligomer having a molecular weight of about 1,500 and containing addition-reactive nadic acid at terminals, and this oligomer is a heat-curable resin which is converted through an amic acid prepolymer to a polyimide polymer, which is crosslinked by the ring-opening addition reaction of terminal nadic acid. This addition-curing type polyimide, however, has a problem in that it is soluble only in a high-boiling-point solvent such as NMP or DMF.

As the result of investigations made with a view to improving this solubility, a PMR type polyimide (in-situ polymerization of monomeric reactants), which is formed by esterification of a carboxylic anhydride type monomer with an alcohol followed by dissolving the resulting ester in an alcohol as the solvent, has been developed by TRM Systems Co., U.S.A. [J. Appl. Polym. Sci., 16, (1972), 905]. In contrast to the conventional polyimide wherein a varnish is prepared by dissolving the amic acid prepolymer in a high-boiling-point solvent, this PMR type polyimide is characterized in that a varnish is prepared by dissolving monomers in a low-boiling-point solvent. For example, in the case of PMR-15, which is a typical resin of the PMR type polyimide, a varnish is prepared by dissolving dimethyl 3,3′,4,4′-benzophenonetetracarboxylate (BTDE), monomethyl nadate (NE) and 4,4′-diaminodiphenylmethane (DDM) as the monomers directly in methanol, and a prepreg is prepared by using this varnish according to the wet method. NE, however, has a higher reactivity with a diamine such as DDM, compared with an aromatic tetracarboxylic acid diester such as BTDE, and therefore, during storage of the varnish, the reaction between NE and DDM is preferentially advanced and bisnadimide (BNI) having a low molecular weight is formed [ACS Organic Coatings and Plastics, 40, (1979), 935 and J. Appl. Polym. Sci., 27, (1982), 4295]. Since the monomer composition in the prepared resin solution is thus changed during the storage, it is very difficult to prepare a prepreg having a stable quality.

If BNI is formed in a large quantity, the remaining monomers form a high-molecular-weight oligomer, and therefore, the molecular weight distribution of the resin as a whole is changed, resulting in a degradation of the moldability, for example, a reduction of the flowability during the molding operation. Furthermore, in the thus-obtained composite material, the mechanical properties such as interlaminar shear strength and flexural strength are reduced, and adverse influences are imposed on the heat resistance, for example, a lowering of the heat decomposition temperature occurs, [National SAMPE Symposium, 26, (1981), 89].

DISCLOSURE OF THE INVENTION

An object of the present invention is to provide a PMR type polyimide varnish having none of the above-mentioned defects and having an excellent storage stability, an endcapping agent to be used for preparing this varnish, and an intermediate material, impregnated with this varnish, for a fiber material-reinforced composite material.

In accordance with one aspect of the present invention, there is provided an endcapping agent for a polyimide, which is represented by the following general formula [1]:

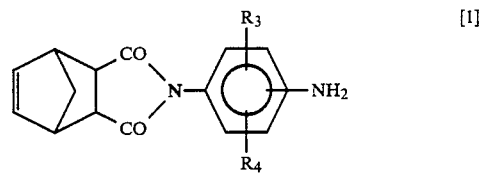

wherein $R_3$ and $R_4$ are independently selected from the group consisting of hydrogen and alkyl groups having 1 to 4 carbon atoms.

In accordance with another aspect of the present invention, there is provided a PMR type polyimide varnish comprising an endcapping agent represented by the above-mentioned general formula [1], a dialkyl ester of a tetracarboxylic acid represented by the following general formula [2]:

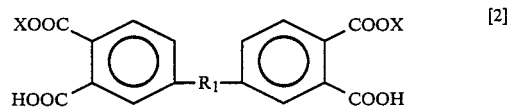

and a diamine represented by the following general formula [3]:

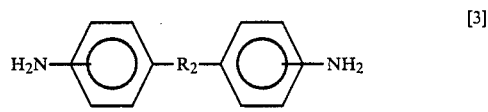

In the above-mentioned general formula [2] and [3], $R_1$ is a direct bond or stands for $CH_2$, $O$, $CO$, $SO_2$, $S$ or $C(CH_3)_2$, X stands for an alkyl group having 1 to 4 carbon atoms, and $R_2$ is a direct bond or stands for $CH_2$, O, CO, $SO_2$, S or $C(CH_3)_2$.

In accordance with still another aspect of the present invention, there is provided an intermediate material for a fiber-reinforced composite material, which comprises a reinforcing fiber impregnated with the above-mentioned polyimide varnish.

BEST MODE FOR CARRYING OUT THE INVENTION

The compound of the present invention represented by the general formula [1] is used as the endcapping agent for a polyimide. The polyimide is not limited to a PMR type polyimide, but the compound is especially valuably used for a PMR type polyimide, as described hereinafter.

The present inventors carried out research with a view to clarifying the cause of the formation of BNI in a monoalkyl ester of nadic acid (NE) as the conventional nadic acid type terminal blocking agent during the storage, and as a result, arrived at the following conclusion. Namely, the fundamental cause resides in the difference of the chemical structure between BTDE as the monomer constituting the main chain of the PMR type polyimide, which is a dialkyl ester of an aromatic tetracarboxylic acid, and NE which is a monoalkyl ester of an alicyclic dicarboxylic acid. The reaction between a monoalkyl ester of an aromatic dicarboxylic acid and an aromatic amine begins at a temperature of 100° C. or higher, but since a monoalkyl ester of an alicyclic dicarboxylic acid has a high reactivity, the reaction with an aromatic amine is quickly advanced even at room temperature. Accordingly, to solve the above-mentioned problem, the reactivity of the endcapping agent must be reduced to a level almost equal to the reactivity level of other monomers constituting the main chain of the PMR type polyimide. The nadimide type endcapping agent having an aromatic amine as the reactive portion, as shown in the general formula [1], has a controlled reactivity and satisfies the above requirement. Namely, by introducing an aromatic amine instead of using the alicyclic dicarboxylic acid monoester having a high reactivity as the reactive portion of the endcapping agent, it becomes possible to impart a reactivity almost equal to that of other monomers to the endcapping agent.

As specific examples of the compound represented by the general formula [1], there can be mentioned 1-amino-4-nadimidobenzene, 1-amino-2-methyl-4-nadimidobenzene and 1-amino-2,6-dimethyl-4-nadimidobenzene.

The endcapping agent of the present invention is a novel compound and can be synthesized according to the following processes. According to the first process, nadic anhydride is reacted with nitroaniline or an alkyl-substituted derivative thereof in an acetamide solution to synthesize nadimidonitrobenzene as an intermediate, and the intermediate is reduced with stannous chloride, as represented by the following reaction formula (1):

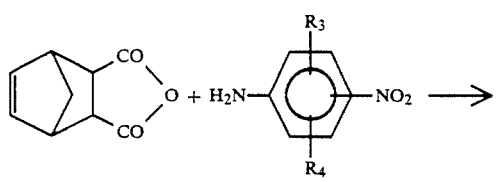

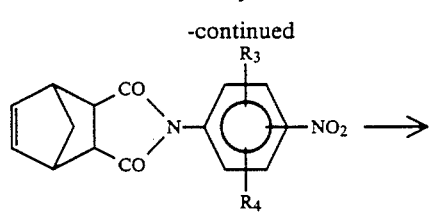

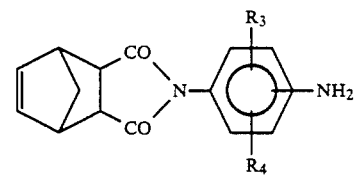

According to the second process, a maleimidonitrobenzene compound is synthesized, cyclopentadiene is added to this compound, and finally, the nitro group is reduced, as represented by the following reaction formula (2):

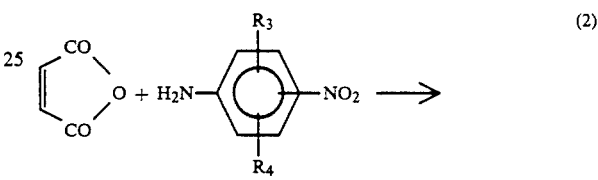 (2)

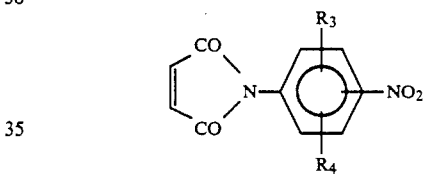

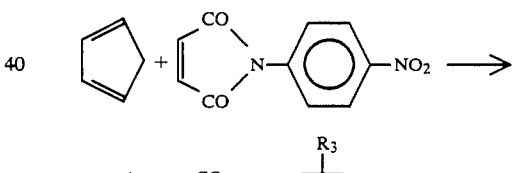

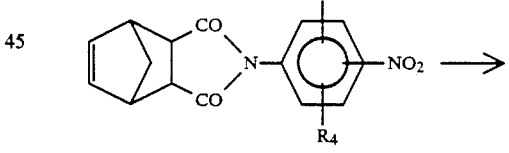

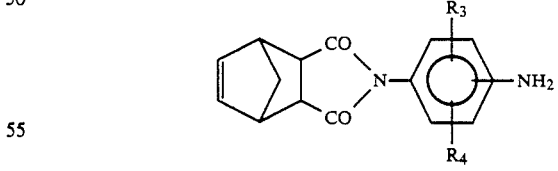

The PMR type polyimide varnish of the present invention comprises an endcapping agent represented by the general formula [1], a dialkyl tetracarboxylate represented by the general [3], a diamine represented by the general formula [3] as an optional component and an organic solvent as an optional component.

As specific examples of the dialkyl tetracarboxylate represented by the general formula [2], there can be mentioned dimethyl 3,3',4,4'-benzophenonetetracarboxylate and diethyl 3,3',4,4'-benzophenonetetracarboxylate.

As specific examples of the diamine represented by the general formula [3], there can be mentioned 4,4′-diaminodiphenylether, 3,3′-diaminodiphenylether, 4,4′-diaminodiphenylmethane, 3,3′-diaminodiphenylmethane, 4,4′-diaminodiphenylsulfone and 3,3′-diaminodiphenylsulfone.

In the PMR type polyimide type varnish of the present invention, the [1]/[2]/[3] molar ratio of the abovementioned three components is preferably in the range of 2/(m′+1)/m, in which m and m′ are numbers of from 0 to 10, more preferably from 0.4 to 2, and when m≧1, m′/m is in the range of from 0.6 to 1.4 and when m<1, (m−m′) is in the range of from −0.4 to +0.4.

The PMR polyimide varnish of the present invention can be prepared by dissolving the endcapping agent represented by the general formula [1], the dialkyl tetracarboxylate represented by the general formula [2] and the diamine represented by the general formula [3] in an organic solvent. As the organic solvent, there can be mentioned alcohols represented by the general formula R′OH (in which R′ stands for an alkyl group having 1 to 4 carbon atoms) (such as methanol and ethanol), and dimethylformamide. The amount of the solvent is 0 to 20% by weight based on the entire amount of the polyimide varnish. If the composition comprising the three components [1], [2] and [3] has an appropriate viscosity, the solvent need not be used.

The polyimide oligomer obtained from the PMR polyimide varnish can have an optional average molecular weight, if the endcapping agent/dialkyl tetracarboxylate/diamine molar ratio is adjusted to 2/(n+1)/n in which n indicates the number of the recurring units of the oligomerization product.

From the PMR type polyimide varnish of the present invention, various resins differing in the heat resistance, physical properties and moldability can be obtained by controlling the chemical structures of the diamine type monomer and dialkyl tetracarboxylate type monomer and the average molecular weight attained by the oligomerization.

In the resin obtained from the PMR type polyimide varnish, the mechanical characteristics are improved as the average molecular weight attained by the oligomerization is increased, but the heat resistance or moldability is degraded. Accordingly, the average number n of the recurring units represented by the oligomerization is preferably in the range of from 0 to 10. Especially, if n is in the range of from 0.4 to 2, a preferred PMR type polyimide varnish having a good balance among the heat resistance, moldability, and physical properties can be obtained.

To adjust the viscosity or tackiness of the varnish or improve the toughness, elastic modulus, elongation, and other mechanical properties of a cured product obtained from the PMR type polyimide varnish, appropriate amounts of a thermoplastic polymer such as polyether sulfone, polysulfone or thermoplastic polyimide, an epoxy resin and diallyl bisphenol A or other reactive diluent can be added to the PNR type polyimide varnish of the present invention according to need. In general, the amount of these additive components is up to 40% by weight based on the total amount of the polyimide varnish exclusive of the organic solvent.

When a reinforcing fiber is impregnated with the PMR type polyimide varnish of the present invention, the obtained prepreg has a good tack or drapability and an excellent moldability, and the resin obtained by curing has excellent heat resistance and mechanical properties. Therefore, the PMR type polyimide varnish of the present invention is most suitable as the matrix resin for a fiber-reinforced composite material. Moreover, the varnish of the present invention is preferable as an adhesive or molding material.

When the PMR type polyimide varnish of the present invention is used for a fiber-reinforced composite material, a carbon fiber, a graphite fiber, an aramid fiber, a silicon carbide fiber, an alumina fiber, a boron fiber, a glass fiber or the like is used as the reinforcing fiber. A carbon fiber having a high tenacity is especially preferred. A mixture of different kinds of fibers can be used. The shape of the fiber is not particularly critical, and the fiber can take any form of a filament, a woven fabric, a knitted fabric, a mat and a cut fiber. Preferably, in the fiber-reinforced composite material, the mixing ratio between the reinforcing fiber and the PMR the polyimide varnish is such that the amount of the former is 30 to 80% by weight and the amount of the latter is 70 to 20% by weight (exclusive of the organic solvent).

The present invention will now be described in detail with reference to the following examples.

EXAMPLE 1

Synthesis of 1-amino-4-nadimidobenzene a. 1-Nitro-4-nadimidobenzene

In 500 ml of dimethylacetamide was dissolved 138 g of 1-amino-4-nitrobenzene, and a solution of 164 g of nadic anhydride in 500 ml of dimethylacetamide was dropped into the above solution with stirring at room temperature. After the dropwise addition, the mixture was stirred at room temperature for 1 hour, and 150 ml of triethylamine and 150 ml of benzene were added to the mixture and reaction was carried out at 140° C. for 3 hours. After completion of the reaction, the reaction mixture was allowed to stand for one whole day and night. The reaction mixture was poured into water and a precipitate of an orange color was recovered by filtration, washed with water and vacuum-dried.

Yield: 236 g (83%).

Results of elementary analysis (% by weight; parenthesized values=calculated values): C: 63.98 (63.38), H: 4.11 (4.23), N: 10.02 (9.86)

b. 1-Amino-4-nadimidobenzene

In acetonitrile was dissolved 200 g of 1-nitro-4-nadimidobenzene, and 850 g of stannic chloride dihydrate was added to the solution and reaction was carried out at 60° C. for 2 hours. The reaction mixture was cooled to room temperature, poured into water, and then neutralized with sodium carbonate. The precipitate was recovered by filtration, vacuum-dried and subjected to Soxhlet extraction with acetonitrile. Acetonitrile was removed by distillation under reduced pressure to obtain a white solid.

Yield: 130 g (75%).

Results of elementary analysis (% by weight; parenthesized values=calculated values) C: 70.32 (70.87), H: 5.68 (5.51), N: 10.87 (11.02).

EXAMPLE 2

Ethanol was added to 3,3′,4,4′-benzephenonetetracarboxylic acid and the mixture was refluxed at the boiling point for 3 hours to dissolve the tetracarboxylic acid completely in ethanol and obtain a solution of a diesterified compound (BTDE). Then, 1-amino-4-nadimidobenzene (ANB) as the endcapping agent and 4,4′- diaminodiphenylmethane (DDM) were dissolved in the solution, so that the ANB/BTDE/DDM molar ratio was 2/3/2. Excessive ethanol was removed from the solution by distillation under reduced pressure to obtain a PMR type polyimide varnish.

The varnish was stored at 20° C. and was analyzed by the high speed liquid chromatography at certain time intervals. Even after the lapse of 60 days, no change of the composition occurred, and it was confirmed that the storage stability was good.

A prepreg was prepared by using the varnish stored at 20° C. for 60 days and a carbon fiber (Toreca T400 supplied by Toray) according to the hot-melt method. The resin content of the obtained prepreg was 39.6%. The obtained prepreg was cut into test pieces having a width of 30 cm and a width of 20 cm, which were laminated and compressed under 14 kg/cm$^2$ at 160° C. in an autoclave. Then, the temperature was elevated to 290° C., the laminate was maintained at this temperature for 2 hours, and the laminate was then cooled to room temperature and the resulting molded article taken out of the autoclave. The molded article was post-cured at 316° C. for 6 hours to obtain a molded article. The content of the carbon fiber in the obtained molded article was 60.2% by volume, and the glass transition temperature measured by the DSC method was 332° C. and it was confirmed that the molded article had a good heat resistance.

A test piece was cut out from the molded article according to ASTM D-790, and the flexural characteristics were measured. It was found that the molded article had excellent characteristics such as a flexural strength of 190 kg/mm$^2$ and a flexural elastic modulus of 13.8 t/mm$^2$.

For comparison, a PMR type polyimide varnish was prepared in the same manner as described above except that monomethyl nadate (NE) was used as the endcapping agent and the NE/BTDE/DDM molar ratio was adjusted to 2/2/3.

The varnish was stored at 20° C. and was analyzed by the high speed liquid chromatography at certain time intervals. After the lapse of 60 days, bisnadimide was formed in an amount of 13% and the composition of the varnish was changed. By using this varnish, a prepreg was prepared and a composite material was formed in the same manner as described above. When the flexural characteristics of the composite material were measured, it was found that the composite material had low physical properties such as a flexural strength of 162 kg/mm$^2$ and a flexural elastic modulus of 13.6 t/mm$^2$.

INDUSTRIAL APPLICABILITY

The endcapping agent of the present invention represented by the general formula [1] is valuable as an endcapping agent to be incorporated in a PMR type polyimide varnish. The formed PMR type polyimide varnish is characterized by a good storage stability and is especially valuable as a matrix resin having high mechanical properties, to be incorporated in a fiber-reinforced composite material.

We claim:

1. An endcapping agent for a polyimide represented by the following general formula [1]:

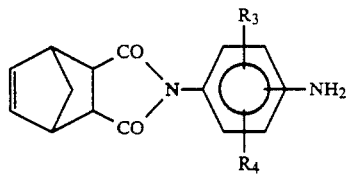

wherein $R_3$ and $R_4$ are independently selected from the group consisting of hydrogen and alkyl groups having 1 to 4 carbon atoms.

2. A PMR type polyimide varnish comprising an endcapping agent represented by the following general formula [1]:

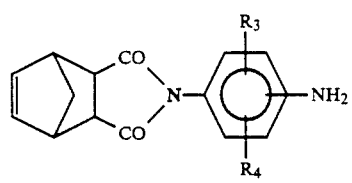

wherein $R_3$ and $R_4$ are independently selected from the group consisting of hydrogen and alkyl groups having 1 to 4 alkyl groups, a dialkyl tetracarboxylate represented by the following general formula [2]:

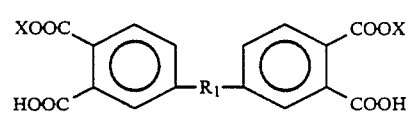

wherein $R_1$ is a direct bond or stands for $CH_2$, O, CO, $SO_2$, S or $C(CH_3)_2$ and X stands for an alkyl group having 1 to 4 carbon atoms, and a diamine represented by the general formula [3]:

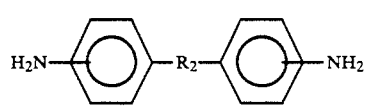

wherein $R_2$ is a direct bond or stands for $CH_2$, O, CO, $SO_2$, S or $C(CH_3)_2$.

3. A varnish as set forth in claim 2, wherein the [1]/[2]/[3] molar ratio of the components of the general formulae [1], [2] and [3] is 2/(m'+1)/m, in which m and m' are numbers of from 0 to 10, and when m≧1, m'/m is in the range of from 0.6 to 1.4 and when m<1, (m−m') is in the range of from −0.4 to +0.4.

4. A varnish as set forth in claim 3, wherein m and m' are numbers of from 0.4 to 2.

5. A varnish as set forth in claim 2, which further comprises up to 20% by weight of an organic solvent based on the polyimide varnish.

6. An intermediate material for a fiber-reinforced composite material, which comprises a reinforcing fiber impregnated with a PMR type polyimide varnish comprising an endcapping agent represented by the following general formula [1]:

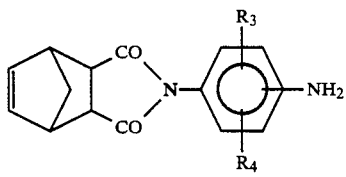

wherein $R_3$ and $R_4$ are independently selected from the group consisting of hydrogen and alkyl groups having 1 to 4 carbon atoms, a dialkyl tetracarboxylate represented by the following general formula [2]:

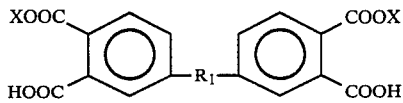

wherein $R_1$ is a direct bond or stands for $CH_2$, O, CO, $SO_2$, S or $C(CH_3)_2$ and X stands for an alkyl group having 1 to 4 carbon atoms, and a diamine represented by the following general formula [3]:

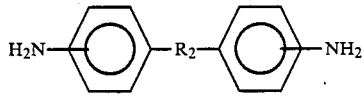

wherein $R_2$ is a direct bond or stands for $CH_2$, O, CO, $SO_2$, S or $C(CH_3)_2$.

7. An intermediate material for a composite material as set forth in claim 6, wherein in the PMR type polyimide varnish, the [1]/[2]/[3] molar ratio of the components represented by the general formulae [1], [2] and [3] is $2/(m'+1)/m$, in which m and m' are numbers of from 0 to 10, and when $m \geq 1$, m'/m is in the range of from 0.6 to 1.4 and when $m < 1$, (m−m') is in the range of from −0.4 to +0.4.

8. An intermediate material for a composite material as set forth in claim 7, wherein m and m' are numbers of from 0.4 to 2.

9. An intermediate material for a composite material as set forth in claim 6, wherein the polyimide varnish comprises up to 20% by weight of an organic solvent based on the polyimide varnish.

10. An intermediate material for a composite material as set forth in claim 6, wherein the mixing ratio between the reinforcing fiber and the PMR type polyimide varnish is such that the amount of the former is 30 to 80% by weight and the amount of the latter is 70 to 20% by weight.

* * * * *